Feb. 7, 1933.  G. A. PERLEY  1,896,916
METHOD OF MAKING COMMERCIAL HYDROGEN
Filed Oct. 27, 1928
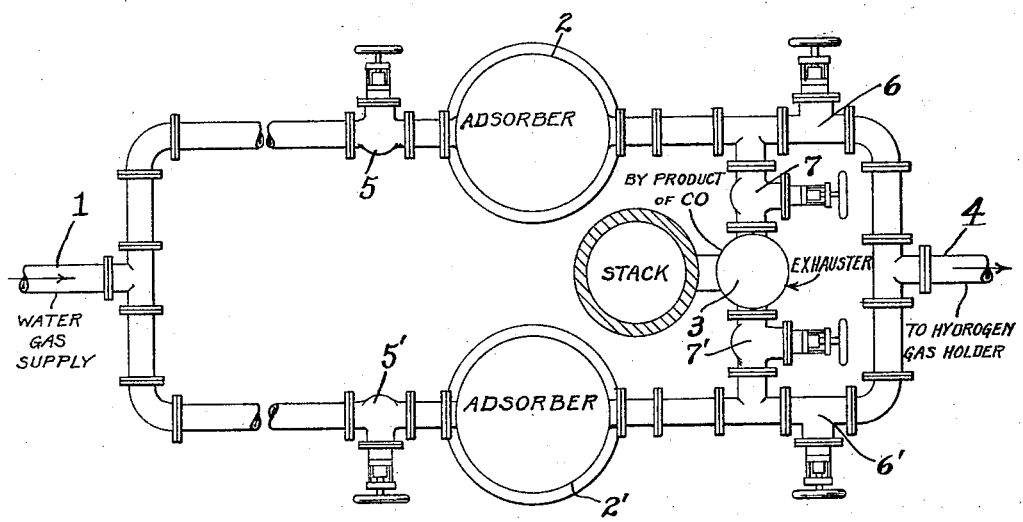
INVENTOR:
George A. Perley,
BY
His ATTORNEY Patented Feb. 7, 1933

1,896,916

UNITED STATES PATENT OFFICE

GEORGE A. PERLEY, OF DURHAM, NEW HAMPSHIRE

METHOD OF MAKING COMMERCIAL HYDROGEN

Application filed October 27, 1928. Serial No. 315,426.

This invention relates to the manufacture of commercial hydrogen, and has for its particular objects the efficient and economical separation of hydrogen by adsorption from water gas, as well as the provision of a suitable apparatus for effecting such recovery.

The principal methods at present in use for the separation and purification of hydrogen may be generally classified as follows:—

1. The liquefaction method, wherein the separation is accomplished through cooling, compression and fractioning off the CO.

2. The Berthelot process, wherein the carbon monoxide (CO) is absorbed in a solution of caustic alkali.

3. Preferential catalytic combustion of CO by steam, or by steam and oxygen, followed by the absorption of the carbon dioxide under pressure in water or ammoniacal cuprous, carbonate solutions.

4. Diffusion methods, wherein advantage is taken of the different rates of diffusion of carbon monoxide and hydrogen.

5. Catalytic union of CO and H by methanol catalysts, such as zinc-copper or zinc-chromium catalysts, although this process is not especially well adapted to water gas.

My investigations have led to the discovery that the production of commercial hydrogen can be advantageously accomplished by causing a water gas mixture to pass through a suitable adsorption system containing certain colloidal oxides or hydrous oxides, such as hereinafter described, whereby the latter are caused to adsorb the carbon monoxide and the carbon dioxide from the water gas mixture and permit of the recovery of the hydrogen in a commercially pure form.

Well known principles of gas adsorption embody the following principles:

The process of adsorption is a reversible one.

The lower the temperature the better the adsorption, but each adsorber and each gas has its own specific type of adsorption curve.

A solid hydrous oxide containing a definite amount of adsorbed gas at a given temperature is in equilibrium with a particular concentration of gas.

This equilibrium will be disturbed by any change in concentration or temperature of the gas around the solid hydrous oxide and the solid hydrous oxide will either liberate or take up more gas depending upon the direction of the change.

The concentration of carbon monoxide in the solid oxide can be reduced by passing a stream of air, steam, etc. through the solid hydrous oxide bed, or by reducing the pressure in the vessel containing the solid hydrous oxide.

All adsorbers are generally porous bodies with a large internal volume.

My invention is more fully set forth and described in the following specification and drawing forming a part thereof, in which latter the figure shown is a diagrammatic view of an apparatus suitable for carrying out my improved process.

Referring to the adsorption system shown in the drawing, the reference number 1 designates the inlet conduit of the system, which latter includes adsorber vessels 2, 2', a common exhauster 3 for the CO by-product and an outlet conduit 4 which conducts the resultant hydrogen to the gas holder (not shown). Valves 5, 5', 6, 6', and 7, 7' control the admission of the water gas to the respective adsorbers 2, 2', the passages leading therefrom to the common outlet 4 and the periodic communication between the common exhauster 3 and the adsorbers 2, 2' respectively.

In carrying out my improved process I preferably proceed as follows:

The valves 5, 5' are alternately opened, being controlled either manually or automatically, so as to alternately admit the water gas from the supply pipe to the adsorbers 2, 2' respectively, whereby one of the adsorbers is always adsorbing the carbon monoxide and the carbon dioxide from the water gas mixture while the hydrogen meanwhile passes through the system to the gas-holder. The alternate adsorber having become saturated with carbon monoxide and shut off from the water gas supply, in response to the influence of the exhauster 3, will be yielding up the separated carbon monoxide and carbon dioxide which will pass through the exhauster and to the stack thereof. Obviously the valves 6, 6' are operated in orderly succession with the valves 5, 5' and 7, 7', the valve 6, however, being open when the valves 5', 6' and 7 are closed and vice versa, so that the exhauster will only exhaust the adsorber in which the adsorption has been completed.

The carbon monoxide will pass up the stack of the exhauster and if desired, can be collected as a by-product, the same being utilizable as a source of heat energy or for other chemical purposes. It will only be liberated from the oxides or absorbent material in the adsorbers under the influence of the exhauster. When the admission of water gas is cut off from the adsorber and the exhauster is operated, the rich carbon monoxide which is liberated will pass out through the stack of the exhauster.

By the foregoing process, it is possible to accomplish the selective adsorption of the carbon monoxide which will approximate about 40% of the content of the average water gas, together with the carbon dioxide, which will approximate about 5% of the content of the average water gas, in the specially prepared sponge-like hydrous oxides or in fact, to some degree in all hydrous oxides, while the hydrogen, which approximates about 50% of the content of the average water gas, and the nitrogen and oxygen, which approximates about 4.5% and 0.5% respectively of the content of ordinary water gas, will pass on to the gas holder. The nitrogen is inert and there are but traces of oxygen, so the hydrogen gas so produced has a very high commercial value. The carbon monoxide is a valuable by-product.

As is evident from the foregoing, when one adsorber has reached its saturation point, it will contain for the most part all the CO and $CO_2$ of the raw gas that was fed to it and traces of hydrogen, nitrogen and oxygen. When therefore, such adsorber is then shut off from the raw water gas supply line and the exhauster is operated, these gases will be drawn out of the oxide. These latter gases for the most part consist of CO and $CO_2$, the ratio of CO to $CO_2$ being about 8 of CO to 1 of $CO_2$, there being but traces of other gases. The primary purpose of exhausting is to regenerate the hydrous oxide. After exhausting the adsorber, air, heated to 150° to 200° is preferably driven through the adsorber to activate the hydrous oxide, although this is not essential. The essential feature of the process is the selective separation of the hydrogen from the other gas constituents by the hydrous oxides named hereinafter.

Among the various adsorbents which are particularly suitable for use in the above process, are the colloidal or hydrous oxides of titanium, zirconium, vanadium, columbium, thorium, molybdenum, chromium, manganese, iron, cobalt, nickel, copper, beryllium, magnesium and the rare earths such as lanthanum and cerium, the same being used either alone or by employing mixtures of two or more, or if desired, by mixing with the materials originally employed in the production of the colloidal or hydrous oxides, an aqueous solution of sodium silicate, of a density of approximately 1.375, by slow addition and violent stirring. These oxides, when properly prepared, will have the property of readily adsorbing carbon monoxide and carbon dioxide from a water gas mixture, thus permitting the passage of the hydrogen through the system in a commercially pure form.

The oxides herein specified are in part those of the elements whose electrons are classified in Layer III. (a) and III. (b) of the Octet Theory of the Atom (see classification of Lewis & Langmuir in Getman's "Outlines of Theoretical Chemistry" 3rd edition p. 604) and which for the most part are elements that lack a characteristic valency.

While I have described my preferred method and one embodiment of an apparatus in which the same may be carried out, various modifications thereof may be made without departing from the invention as embraced within the scope of the appended claims.

Having thus described my invention, what I claim and desire to obtain by United States Letters Patent, is

1. The method of producing commercial hydrogen from water gas, which consists in subjecting a current of water gas to the adsorbing action of an adsorbing medium capable of adsorbing the carbon monoxide and carbon dioxide components of such gas while permitting of the free passage therethrough of the hydrogen without adsorption, collecting the hydrogen gas so separated in a receptacle which is temporarily in communication with said adsorber, then opening up communication between said adsorber and vacuum producing means to exhaust the adsorbed gases from said adsorbing medium and thereby revivifying the adsorbing medium and then again reestablishing communication between the source of water gas supply and said adsorbing medium.

2. The method of producing commercial hydrogen from gas mixtures, consisting principally of hydrogen and carbon monoxide and containing a minor percentage of carbon dioxide, which consists in conveying a current of such gas mixture to an adsorbing medium confined in a receptacle and which medium is capable of adsorbing the carbon monoxide and carbon dioxide components of said gas while permitting of the free escape of hydrogen which has passed through such medium without adsorption, thereby collecting the hydrogen issuing from the adsorbing medium, periodically shutting off the supply of gas to said adsorbing medium and regenerating the latter by subjecting the same to the influence of a sub-atmospheric pressure.

3. The method of producing commercial hydrogen from water gas, which consists in subjecting a current of water gas to the adsorbing action of an adsorbing medium capable of adsorbing the carbon monoxide and carbon dioxide components of such gas while permitting of the free passage therethrough of the hydrogen without adsorption, collecting the hydrogen gas so separated in a receptacle which is temporarily in communication with said adsorber, then opening up communication between said adsorber and vacuum producing means to exhaust the adsorbed gases from said adsorbing medium and thereby revivifying the adsorbing medium comprising a colloidal oxide and then again re-establishing communication between the source of water gas supply and said adsorbing medium.

4. The method of producing commercial hydrogen, which consists in subjecting a current of gas comprising a mixture of hydrogen and oxides of carbon to the adsorbing action of an adsorbing medium including at least one member of a group of colloidal oxides capable of adsorbing the carbon monoxide and carbon dioxide components of such gas while permitting of the free passage therethrough of the hydrogen without adsorption, comprising titanium, zirconium, vanadium, columbium, thorium, molybdenum, chromium, manganese, iron, cobalt, nickel, copper, beryllium, magnesium and the rare earths such as lanthanum and cerium, collecting the hydrogen gas so separated in a receptacle which is temporarily in communication with said adsorber, then opening up commuuncation between said adsorber and vacuum producing means to exhaust the adsorbed gases from said adsorbing medium and thereby revivifying the adsorbing medium, and then re-establishing communication between the source of water gas supply and said adsorbing medium.

5. The method of producing commercial hydrogen from gas mixtures, consisting principally of hydrogen and carbon monoxide and containing a minor percentage of carbon dioxide, which consists in providing two separate bodies of adsorbing material capable of adsorbing $CO$ and $CO_2$ while permitting of the passage therethrough of hydrogen, alternately supplying gas to said separated bodies and withdrawing the hydrogen unabsorbed by one body during at least a portion of the period that gas is being supplied by the other body and successively subjecting each body of adsorbing material to the influence of a sub-atmospheric pressure to regenerate the same and then repeating the cycle of operations.

6. The method of producing commercial hydrogen from gas mixtures, consisting principally of hydrogen and carbon monoxide and containing a minor percentage of carbon dioxide, which consists in providing two separate bodies of adsorbing material comprising at least one member of a group of oxides of those specified as belonging in Layer III. (a) or III. (b) of the Octet Theory of the Atom, capable of adsorbing $CO$ and $CO_2$ while permitting of the passage therethrough of hydrogen, alternately supplying gas to said separated bodies and withdrawing the hydrogen unabsorbed by one body during at least a portion of the period that gas is being supplied by the other body and successively subjecting each body of adsorbing material to a sub-atmospheric pressure to regenerate the same and then repeating the cycle of operations.

7. The method of producing commercial hydrogen from gas mixtures, consisting principally of hydrogen and carbon monoxide and containing a minor percentage of carbon dioxide, which consists in providing two separate bodies of adsorbing material comprising at least one member of a group of oxides of those specified as belonging in Layer III. (a) or III. (b) of the Octet Theory of the Atom, capable of adsorbing $CO$ and $CO_2$ while permitting of the passage therethrough of hydrogen, alternately supplying gas to said separated bodies and withdrawing the hydrogen unabsorbed by one body during at least a portion of the period that gas is being supplied by the other body and successively subjecting each body of adsorbing material to a sub-atmospheric pressure and subsequently passing heated air therethrough to regenerate the same and then repeating the cycle of operations.

Signed at Durham, in the county of Strafford and State of New Hampshire, this 24 day of October, 1928.

GEORGE A. PERLEY.